United States Patent

Yasuda (10) Patent No.: US 9,798,157 B2
(45) Date of Patent: Oct. 24, 2017

(54) IMAGE STABILIZING APPARATUS, LENS BARREL, AND IMAGE PICKUP APPARATUS

(71) Applicant: CANON KABUSHIKI KAISHA, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 14/536,852

(22) Filed: Nov. 10, 2014

(65) Prior Publication Data

US 2015/0153584 A1    Jun. 4, 2015

(30) Foreign Application Priority Data

Dec. 2, 2013 (JP) ................. 2013-248893

(51) Int. Cl.
*G02B 27/64* (2006.01)
*G02B 7/02* (2006.01)

(52) U.S. Cl.
CPC ........... *G02B 27/646* (2013.01); *G02B 7/023* (2013.01)

(58) Field of Classification Search
CPC ...... G02B 27/646; G02B 27/64; G02B 7/023; G02B 7/04
USPC ....... 359/577, 554–557; 356/624; 396/52–55
See application file for complete search history.

(56) References Cited

U.S. PATENT DOCUMENTS

| | | | |
|---|---|---|---|
| 5,249,079 A | 9/1993 | Umeda | |
| 6,008,837 A * | 12/1999 | Yonezawa | H04N 7/14 348/211.8 |
| 7,154,199 B2 | 12/2006 | Yasuda | |
| 7,916,210 B2 * | 3/2011 | Hara | G02B 27/646 348/219.1 |
| 7,949,243 B2 | 5/2011 | Suzuki | |
| 2007/0146883 A1 | 6/2007 | Akada et al. | |
| 2009/0251777 A1 | 10/2009 | Suzuki | |
| 2011/0032615 A1 * | 2/2011 | Usui | G02B 27/646 359/554 |
| 2011/0158618 A1 | 6/2011 | Ibi | |
| 2012/0163784 A1 * | 6/2012 | Saito | G02B 27/646 396/55 |
| 2015/0010296 A1 | 1/2015 | Yasuda | |

FOREIGN PATENT DOCUMENTS

| | | |
|---|---|---|
| JP | H03-083006 A | 4/1991 |
| JP | 2004-029640 A | 1/2004 |
| JP | 2010-152168 A | 7/2010 |

OTHER PUBLICATIONS

Teare, Scott et al. Introduction to Image Stabilization. Washington.: SPIE, 2006. Web. Apr. 26, 2016. http://ebooks.spiedigitallibrary.org.*

* cited by examiner

*Primary Examiner* — Ricky Mack
*Assistant Examiner* — Kristina Deherrera
(74) *Attorney, Agent, or Firm* — Fitzpatrick, Cella, Harper & Scinto (57) ABSTRACT

An image stabilizing apparatus includes a movable member holding a lens, a moving unit configured to move the movable member in a predetermined plane, a tilting unit configured to tilt the movable member relative to predetermined plane, a detection unit configured to detect shake, and a control unit configured to control the moving unit and the tilting unit based on shake information obtained from the detection unit. The control unit sets a tilt target value of the tilting unit in accordance with a displacement target value of the moving unit.

12 Claims, 11 Drawing Sheets

IMAGE STABILIZING APPARATUS, LENS BARREL, AND IMAGE PICKUP APPARATUS

BACKGROUND OF THE INVENTION

Field of the Invention

The present invention relates to an image stabilizing apparatus which is mounted on an image pickup apparatus such as a digital camera.

Description of the Related Art

An image stabilizing apparatus moves a movable member that holds a correcting lens (image stabilizing optical system) or an image pickup element in two directions (a yaw direction and a pitch direction) in a plane orthogonal to an optical axis, so as to reduce image blur caused by hand shake during image capturing.

Japanese Patent Laid-open No. 2010-152168 discloses an optical apparatus that adjusts an allowed tilt amount of the image stabilizing optical system in accordance with a focus position of an optical system. This allows optical performance to be improved in accordance with each focal position.

The optical performance is further improved by changing the tilt amount relative to the optical axis in accordance with a displacement amount of the image stabilizing optical system in an optical axis direction. However, a configuration disclosed in Japanese Patent Laid-open No. 2010-152168 does not change the tilt amount in accordance with the displacement amount of the image stabilizing optical system in the optical axis direction. With this configuration, the optical performance when the image stabilizing optical system is moved in the optical axis direction cannot be further improved effectively.

SUMMARY OF THE INVENTION

The present invention provides an image stabilizing apparatus, a lens barrel, and an image pickup apparatus that have improved optical performances.

An image stabilizing apparatus as one aspect of the present invention includes a movable member holding a lens, a moving unit configured to move the movable member in a predetermined plane, a tilting unit configured to tilt the movable member relative to the predetermined plane, a detection unit configured to detect shake, and a control unit configured to control the moving unit and the tilting unit based on shake information obtained from the detection unit, and the control unit sets a tilt target value of the tilting unit in accordance with a displacement target value of the moving unit.

A lens barrel as another aspect of the present invention includes the image stabilizing apparatus.

An image pickup apparatus as another aspect of the present invention includes the lens barrel.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
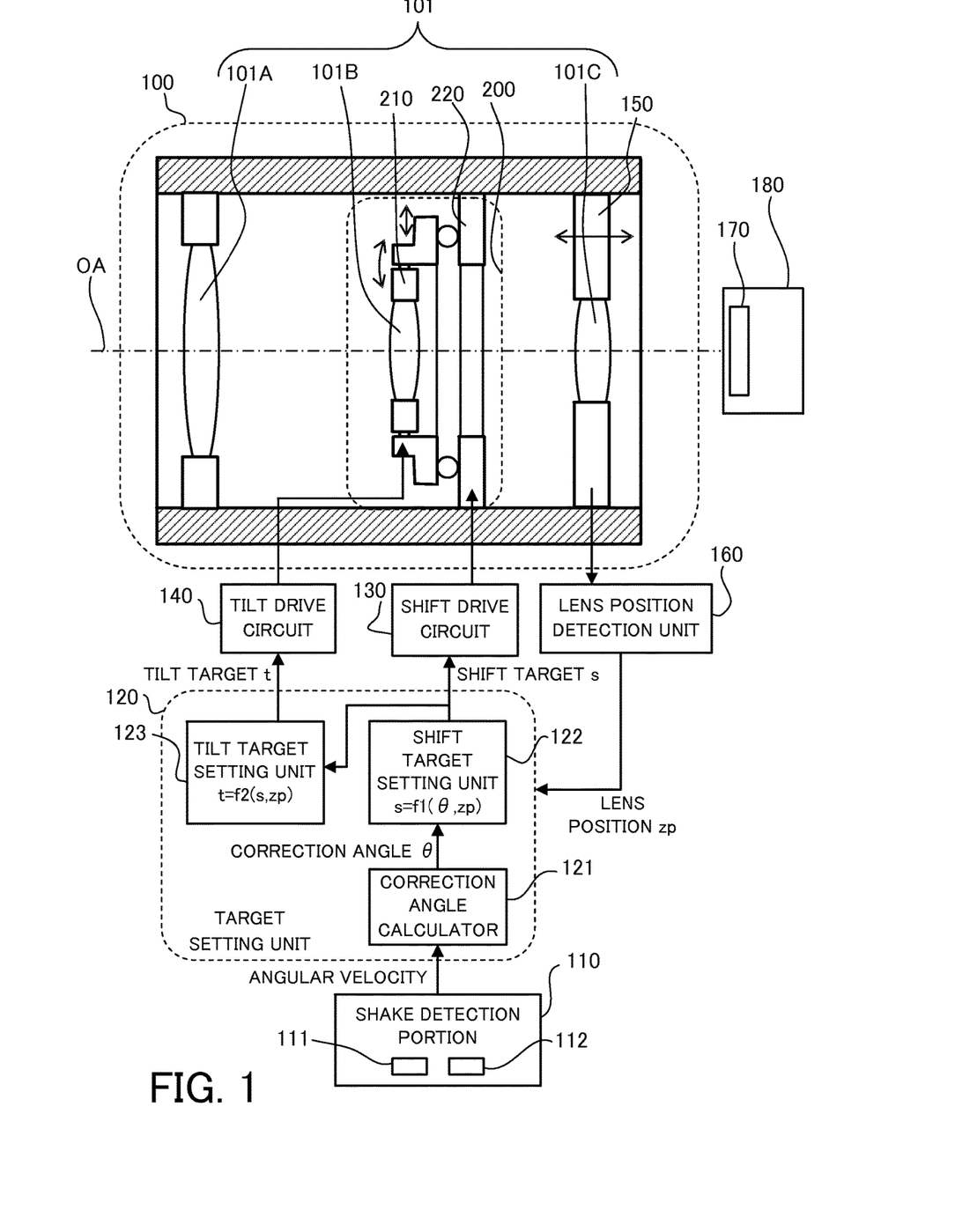
FIG. 1 is a system configuration diagram of a lens barrel in an embodiment of the present invention.

First, referring to FIG. 1, a system configuration of a lens barrel in an embodiment of the present invention will be described. FIG. 1 is a system configuration diagram of a lens barrel 100. The lens barrel 100 includes an image pickup optical system. 101, an image stabilizing apparatus 200, a shake detection portion 110 (detection unit), a target setting unit 120, a shift drive circuit 130, a tilt drive circuit 140, a lens moving mechanism 150, and a lens position detection unit 160. The lens barrel 100 is detachably attached to an image pickup apparatus 180 (camera body) including an image pickup element 170, such as a CMOS and a CCD, that performs photoelectric conversion on an optical image (object image). This enables an image formed on an imaging plane (on a surface on the image pickup element 170) to be recorded and displayed. Alternatively, the lens barrel 100 may be integrated with the image pickup apparatus 180 (camera body) including the image pickup element 170.

The image pickup optical system 101 is an imaging optical system including a plurality of lenses 101A, 101B, and 101C. The lens 101A is a lens fixed on the lens barrel 100, the lens 101B is a correcting lens described later, and the lens 101C is a lens movably supported relative to the lens barrel 100 in a direction of an optical axis OA (optical axis direction) by the lens moving mechanism 150.

The image stabilizing apparatus 200 includes a tilt mechanism 210 (a tilting unit or a rotational moving unit) and a shift mechanism 220 (a shift unit or a shift displacement unit). The tilt mechanism 210 tilts the correcting lens 101B included in the image pickup optical system 101 relative to a predetermined plane (orthogonal to the optical axis OA). In other words, the tilt mechanism 210 tilts the correcting lens 101B relative to the optical axis OA of the image pickup optical system 101 (rotates the correcting lens 101B around a predetermined position thereon). The shift mechanism 220 moves the correcting lens 101B in the predetermined plane (orthogonal to the optical axis OA; also referred to as an optical-axis orthogonal plane). In the present embodiment, the shift mechanism 220 moves a lens frame 202 in a first direction (pitch direction) and a second direction (yaw direction) in the optical-axis orthogonal plane. Then, the tilt mechanism 210 rotates the lens frame 202 around a first axis (pitch axis) along the first direction and a second axis (yaw axis) along the second direction. A detailed configuration of the image stabilizing apparatus 200 will be described later. Hereinafter, the term "optical axis" means an optical axis of lenses (the lenses 101A and 101C) other than the correcting lens 101B included in the image pickup optical system 101, whereas the term "correcting lens optical axis" means an optical axis of the correcting lens 101B.

The shake detection portion 110 (detection unit) detects shake (acceleration of oscillation) of the lens barrel 100. In the present embodiment, the shake detection portion 110 includes a gyro sensor 111 fixed on the lens barrel 100 and a signal processing unit 112. The gyro sensor 111 detects an angular velocity of the lens barrel 100. The signal processing unit 112 processes an output value (detected value) of the gyro sensor 111. Specifically, the signal processing unit 112 performs gain-up and high frequency cut-off on the output value of the gyro sensor 111. In this manner, an angular velocity of the oscillation of the lens barrel 100 (image pickup apparatus) can be obtained. However, a detection method used by the shake detection portion 110 is not limited thereto. The shake detection portion 110 may employ a method of performing image recognition to detect a motion vector of the image formed on the imaging plane so as to determine a shake amount.

The target setting unit 120 (control unit) controls the tilt mechanism 210 and the shift mechanism 220 of the image stabilizing apparatus 200 based on shake information (the angular velocity of the oscillation) obtained from the shake detection portion 110. The target setting unit 120 determines (sets) a tilt target value (tilt target t) of the tilt mechanism 210 in accordance with a displacement target value (shift target s) of the shift mechanism 220. The target setting unit 120 in the present embodiment includes a correction angle calculator 121, a shift target setting unit 122, and a tilt target setting unit 123. The target setting unit 120 will be described in detail later.

The shift drive circuit 130 includes a motor driver configured to supply power to a third drive unit and a fourth drive unit (shift drive units) in the shift mechanism 220 described later in accordance with the shift displacement target value (shift target s) determined by the target setting unit 120. The shift drive circuit 130 may be configured to perform closed-loop control to feed back positions of the shift drive units depending on types of the shift drive units and a required position accuracy. When open-loop control can achieve sufficient accuracy, for example, when stepping motors are used as drive sources of the shift drive units, the shift drive circuit 130 may perform the open-loop control without detecting the positions of the shift drive units.

The tilt drive circuit 140 includes a motor driver that supplies power to a first drive unit and a second drive unit (tilt drive units) in the tilt mechanism 210 described later in accordance with the tilt displacement target value (tilt target t) determined by the target setting unit 120. Similarly to the shift drive circuit 130, the tilt drive circuit 140 may be configured to perform closed-loop control to feed back positions of the tilt drive units depending on types of the tilt drive units and a required position accuracy. Alternatively, the tilt drive circuit 140 may be configured to perform open-loop control.

The lens moving mechanism 150 drives the lens 101C included in the image pickup optical system 101 in the optical axis direction. This enables magnification-varying and focusing of the lens barrel 100. A fixed focus optical system fixed on the lens barrel 100 (configured not to move in the optical axis direction) can still achieve at least part of advantages of the present embodiment.

Figure 2:
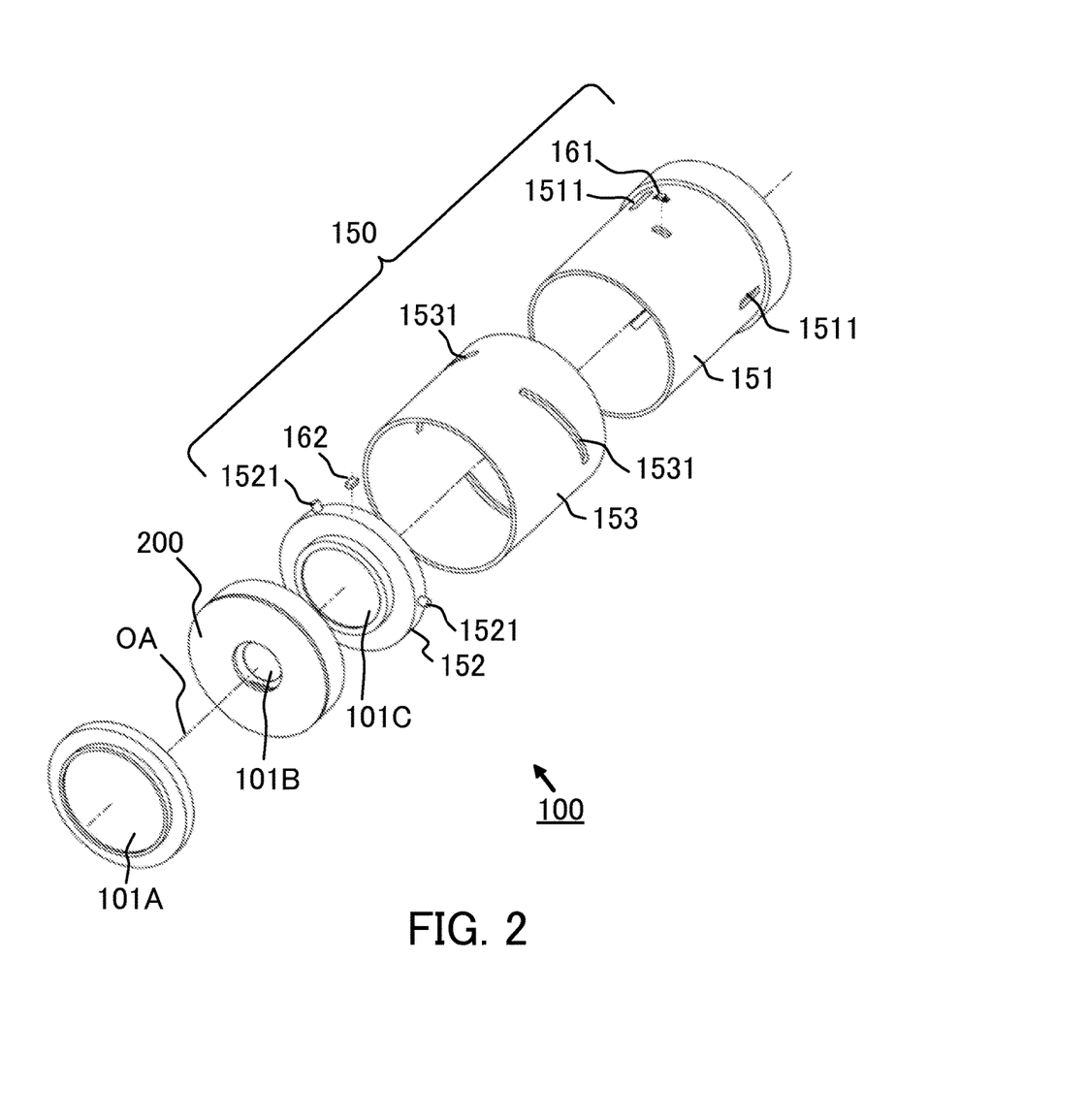
FIG. 2 is an exploded perspective view of the lens barrel in the embodiment.

Next, referring to FIG. 2, a configuration of the lens barrel 100 (lens moving mechanism 150) will be described. FIG. 2 is an exploded perspective view of the lens barrel 100 (lens moving mechanism 150). The lens moving mechanism 150 (second moving unit) includes a fixed barrel 151 including a straight groove 1511, a straight lens frame 152 holding the lens 101C, and a cam barrel 153 including a cam groove 1531.

The straight lens frame 152 has three protrusions 1521 provided on its outer periphery. The three protrusions 1521 are respectively engaged with three straight grooves 1511 formed on the fixed barrel 151 and are supported movably relative to the fixed barrel 151 in the optical axis direction. The cam grooves 1531 formed in the cam barrel 153 are respectively engaged with the three protrusions 1521 of the straight lens frame 152. This enables the cam barrel 153 to be rotated around the optical axis OA and the straight lens frame 152 to be moved in the optical axis direction accordingly. The cam barrel 153 may be driven by direct rotation of an operation ring by a user or may be driven by a motor to a set target value.

The lens position detection unit 160 is a detector that detects a displacement amount of the lens moving mechanism 150 and includes a position sensor 161 and a detection target portion 162. In the present embodiment, the position sensor 161 is attached to the fixed barrel 151 (fixed portion), and the detection target portion 162 is attached to the straight lens frame 152 (movable portion). The position sensor 161 changes an output voltage depending on a position of the detection target portion 162. This enables the lens position detection unit 160 (position sensor 161) to detect a position of the straight lens frame 152 and thus determine the displacement amount of the lens moving mechanism 150.

In the present embodiment, the detection target portion 162 is magnets magnetized in a predetermined pattern. The position sensor 161 is a Hall sensor that detects magnetic force. However, the present embodiment is not limited to this configuration. For example, the position sensor 161 may be a photo-interrupter that is an optical element, and the detection target portion 162 may be a pulse plate on which light-shielding and non-light-shielding units are periodically formed.

Figure 3:
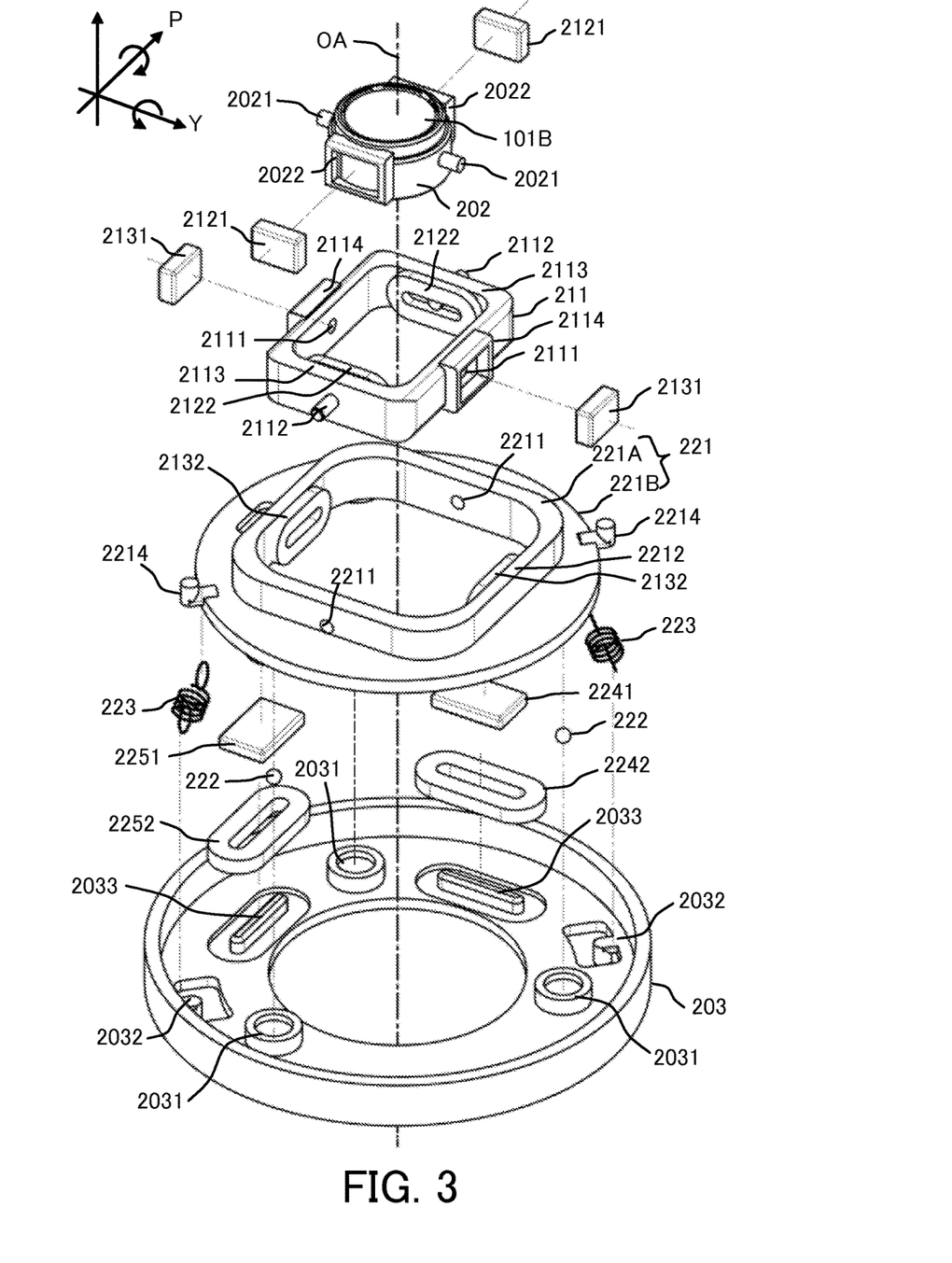
FIG. 3 is an exploded perspective view of an image stabilizing apparatus in the embodiment.
Figure 4:
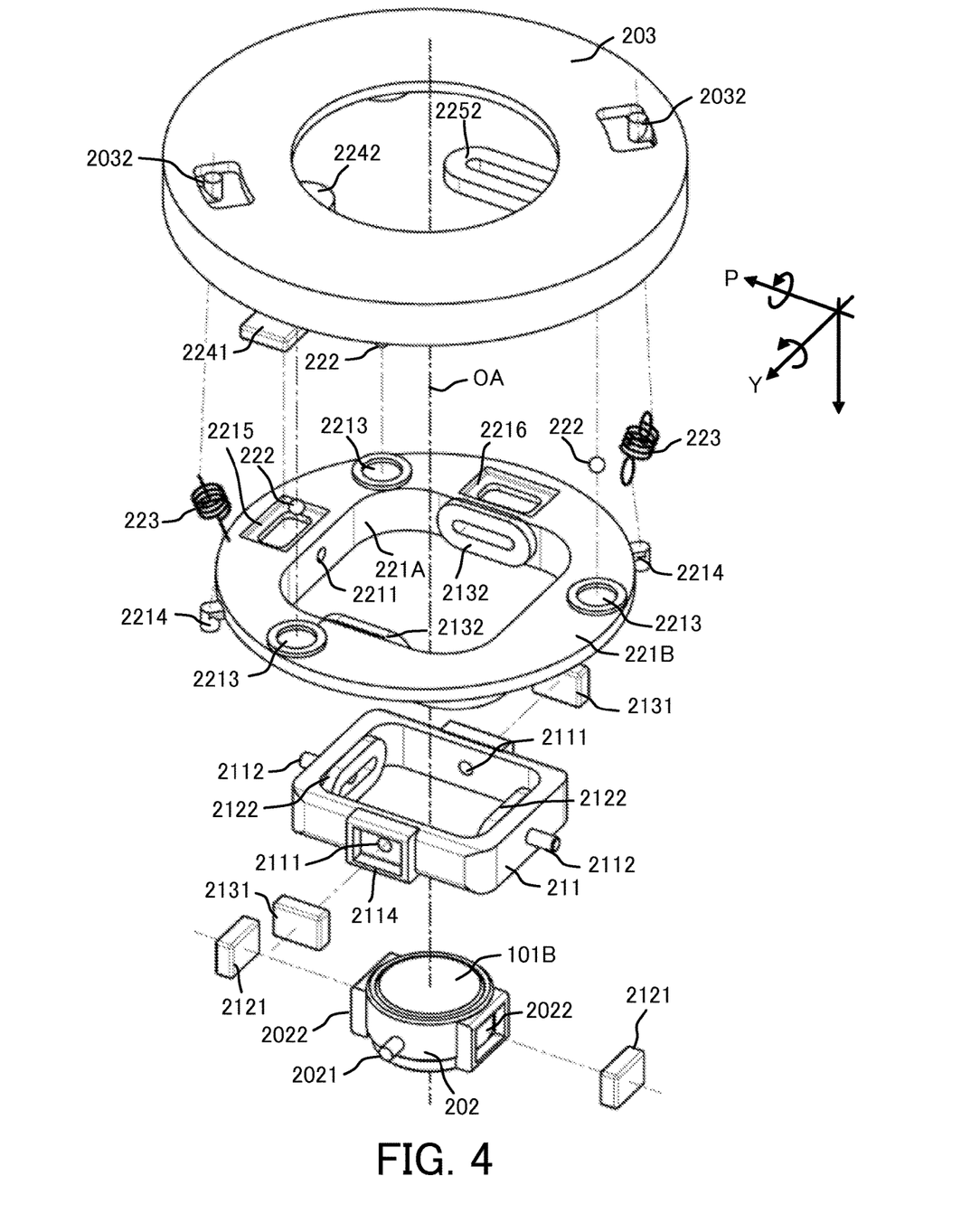
FIG. 4 is an exploded perspective view of the image stabilizing apparatus in the embodiment.
Figure 5:
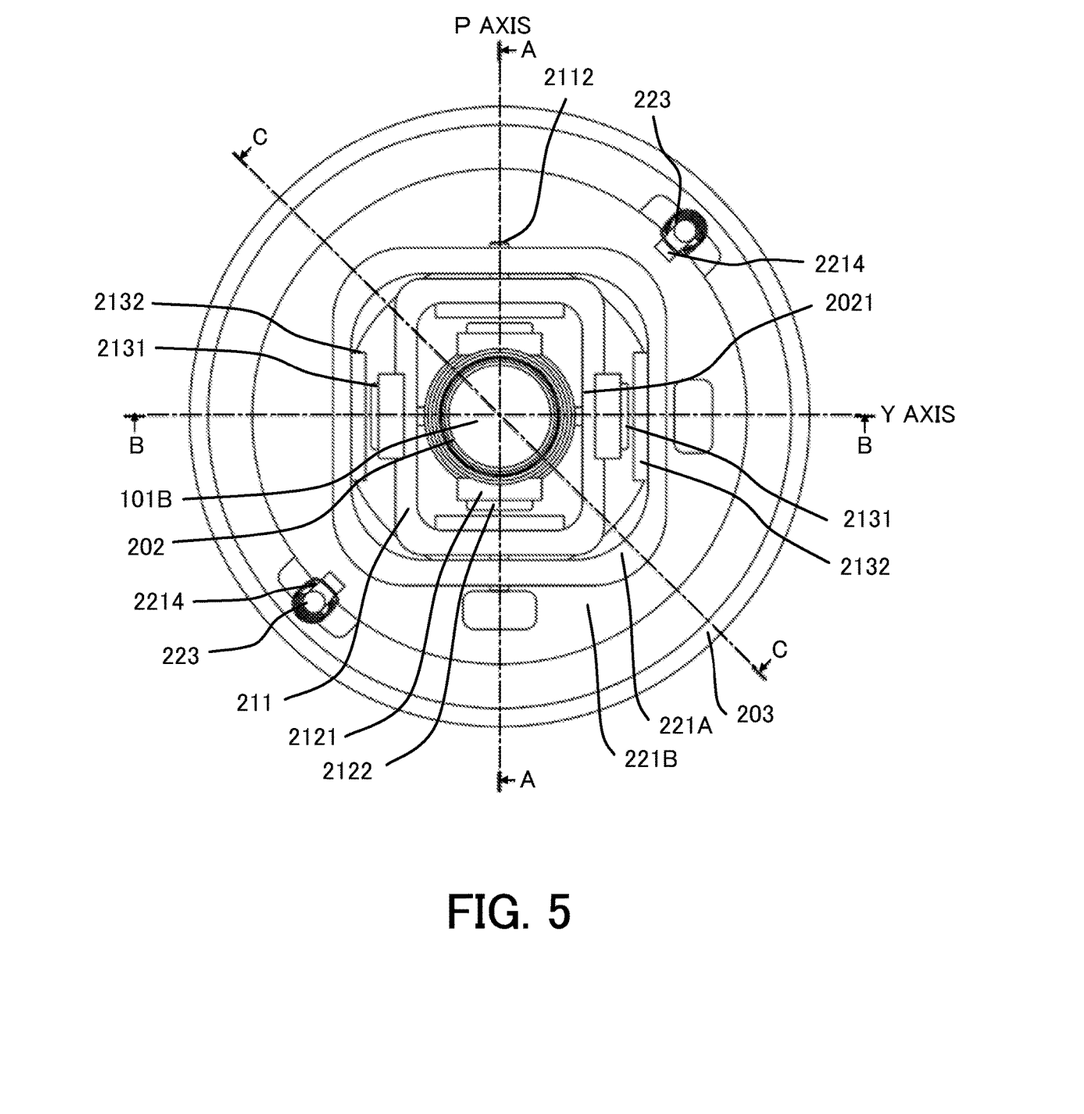
FIG. 5 is a front view of the image stabilizing apparatus in the embodiment after assembled.
Figure 6:
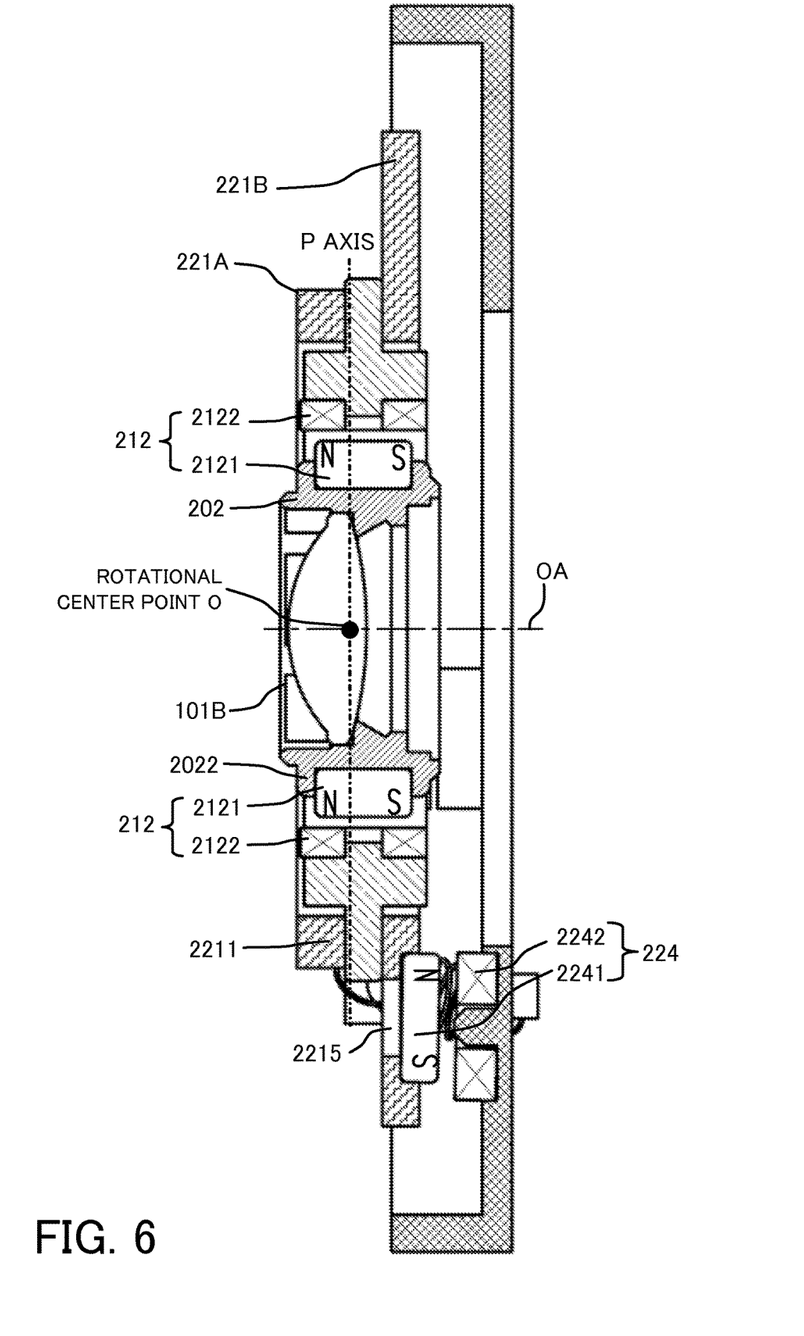
FIG. 6 is a cross-sectional view of the image stabilizing apparatus in the embodiment along line A-A in FIG. 5.
Figure 7:
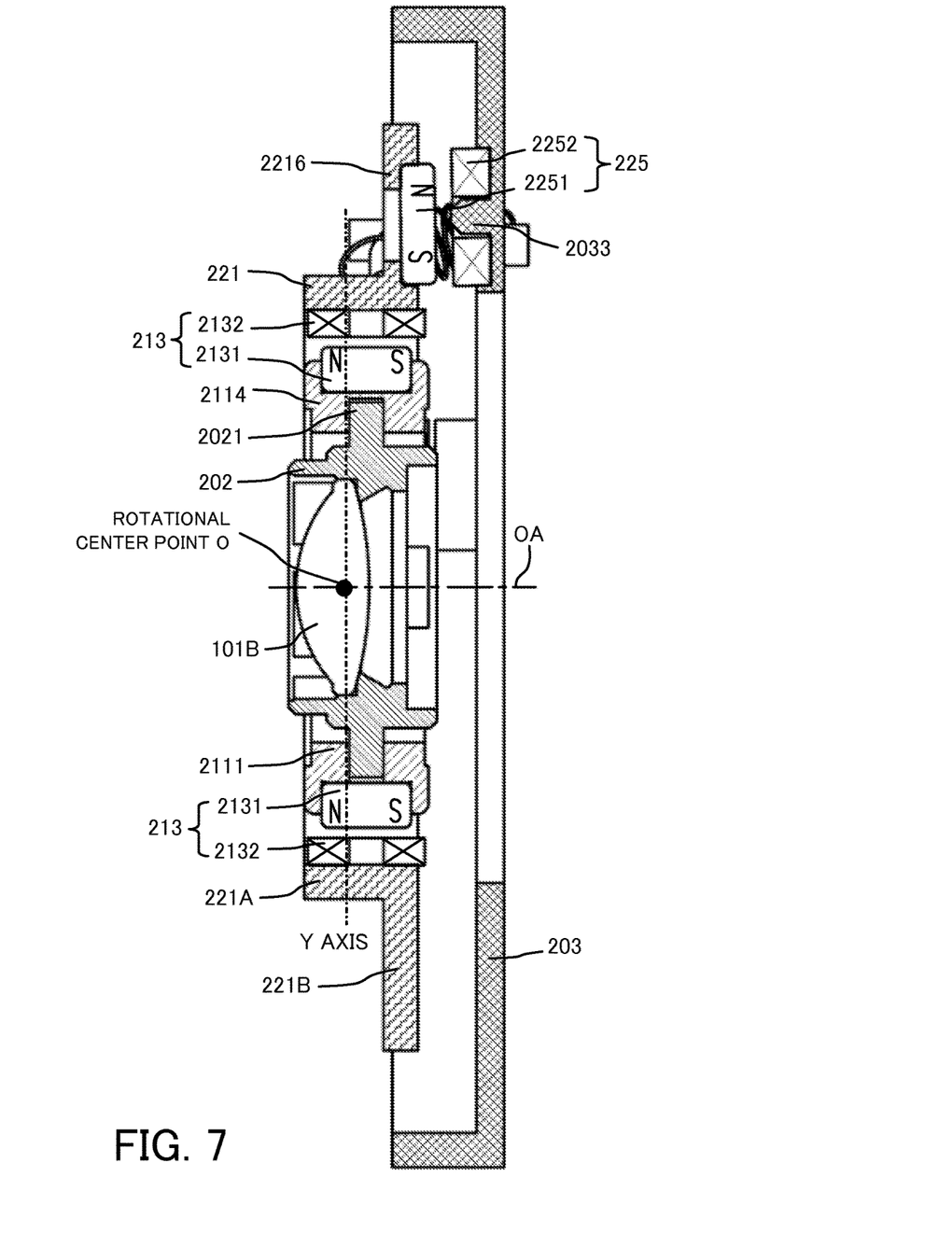
FIG. 7 is a cross-sectional view of the image stabilizing apparatus in the embodiment along line B-B in FIG. 5.
Figure 8:
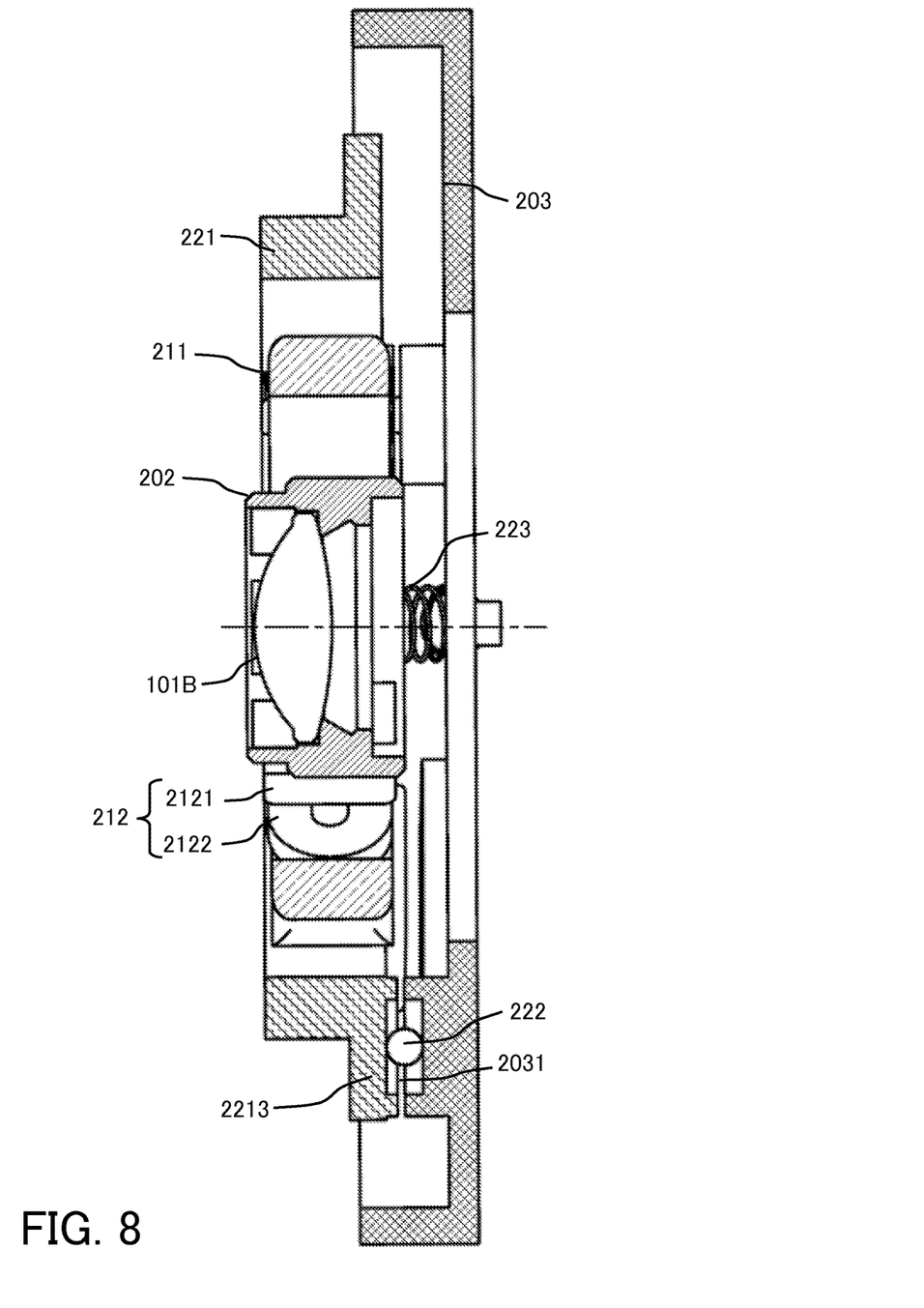
FIG. 8 is a cross-sectional view of the image stabilizing apparatus in the embodiment along line C-C in FIG. 5.
Figure 9:
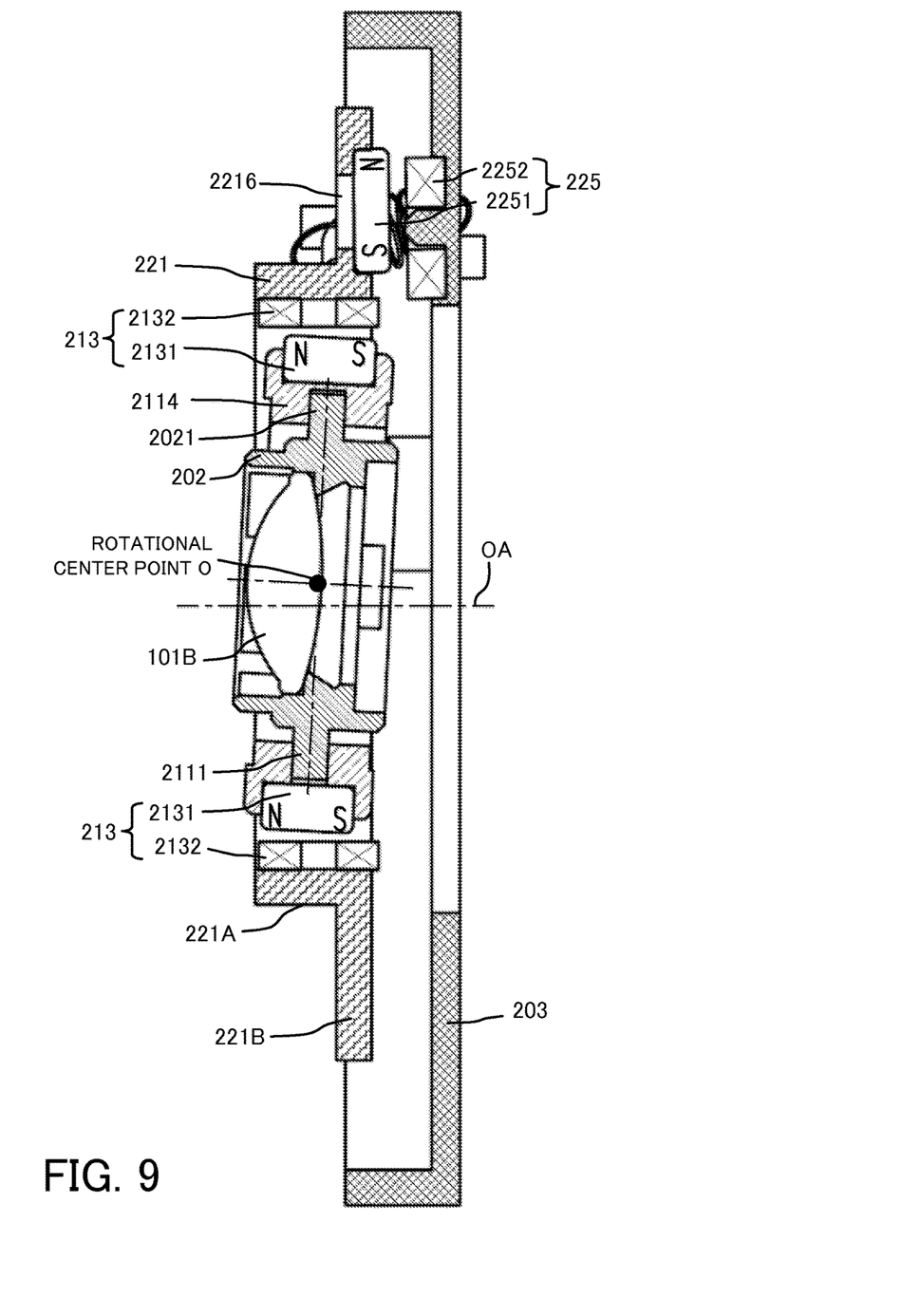
FIG. 9 is a cross-sectional view of the image stabilizing apparatus in the embodiment along line B-B in FIG. 5 after a shift mechanism and a tilt mechanism are driven.

Next, referring to FIGS. 3 to 9, the configuration of the image stabilizing apparatus 200 will be described in detail. FIG. 3 is an exploded perspective view of the image stabilizing apparatus 200. FIG. 4 is an exploded perspective view of the image stabilizing apparatus 200 as viewed oppositely to that illustrated in FIG. 3 in the optical axis direction. FIG. 5 is a front view of the image stabilizing apparatus 200 after assembled as viewed in the optical axis direction. FIG. 6 is a cross-sectional view of the image stabilizing apparatus 200 along line A-A in FIG. 5. FIG. 7 is a cross-sectional view of the image stabilizing apparatus 200 along line B-B in FIG. 5. FIG. 8 is a cross-sectional view of the image stabilizing apparatus 200 along line C-C in FIG. 5. FIG. 9 is a cross-sectional view (of the same section as that illustrated in FIG. 7) of the image stabilizing apparatus 200 along line B-B in FIG. 5 after the shift mechanism 220 and the tilt mechanism 210 are driven.

The image stabilizing apparatus 200 in the present embodiment includes the correcting lens 101B, the lens frame 202 (movable member), a fixed member 203, the tilt mechanism 210, and the shift mechanism 220. The correcting lens 101B (image stabilizing optical system) is included in the image pickup optical system 101 and is movable in a direction orthogonal to the optical axis OA (optical-axis orthogonal direction). This enables an image formed by the image pickup optical system 101 to be moved in a plane orthogonal to the optical axis OA (optical-axis orthogonal plane). Thus, stability on the imaging plane can be ensured when, for example, hand shake is detected. The present embodiment uses the correcting lens 101B as the image stabilizing optical system, but is not limited thereto. The image stabilizing optical system may be achieved by, for example, driving the image pickup element 170 or a prism.

The pitch axis (first axis) is defined to be an imaginary line orthogonally intersecting the correcting lens optical axis at a point (rotational center point O) on the correcting lens optical axis. The yaw axis (second axis) is defined by an imaginary line passing through the rotational center point O and orthogonally intersecting the optical axis of the correcting lens 101B and the pitch axis. In FIGS. 5 to 7, the pitch axis is denoted as a P axis, and the yaw axis is denoted as a Y axis.

The tilt mechanism 210 swings the lens frame 202 along a spherical surface centering on the rotational center point O of the correcting lens 101B. The tilt mechanism 210 in the present embodiment includes a gimbal ring 211, the first drive unit 212, the second drive unit 213, and a shift member 221. The lens frame 202 may be included in the tilt mechanism 210. The first drive unit 212 includes a first magnet 2121 and a first coil 2122. The second drive unit 213 includes a second magnet 2131 and a second coil 2132.

The lens frame 202 (movable member) is cylindrical (or substantially cylindrical) and holds the correcting lens 101B (lens as an optical system or correction optical system) at its center. The lens frame 202 has a yaw rotating shaft 2021 and a magnet holder 2022 on its outer periphery. The yaw rotating shaft 2021 is a cylindrical rotating shaft centering on the yaw axis (Y axis). The magnet holder 2022 holds the first magnet 2121.

The gimbal ring 211 (intermediate member) is a rectangular ring (substantially rectangular ring) and is disposed on an outer periphery of the lens frame 202. The gimbal ring 211 is provided with a yaw axis hole 2111, a pitch rotating shaft 2112, a coil holder 2113, and a magnet holder 2114. The yaw axis hole 2111 is formed on an inner periphery of the gimbal ring 211 and supports the yaw rotating shaft 2021. The pitch rotating shaft 2112 is provided on an outer periphery of the gimbal ring 211 and is a cylinder centering on the pitch axis (P axis). The coil holder 2113 holds the first coil 2122 at a position facing to the first magnet 2121. The magnet holder 2114 holds the second magnet 2131.

The shift member 221 is disposed on the outer periphery of the gimbal ring 211 and includes a barrel portion 221A having a rectangular barrel shape (substantially rectangular barrel shape) and a disk portion 221B having a disk shape (substantially disk shape). The barrel portion 221A serves as part of the tilt mechanism 210. The disk portion 221B serves as part of the shift mechanism 220. The shift member 221 is provided with a pitch axis hole 2211, a second coil holder 2212, a ball holding surface 2213, a spring hook portion 2214, a third magnet holder 2215, and a fourth magnet holder 2216.

The pitch axis hole 2211 is formed on an inner periphery of the barrel portion 221A and supports the pitch rotating shaft 2112. The coil holder 2212 is provided on the inner periphery of the barrel portion 221A and holds the second coil 2132 at a position facing the second magnet 2131. The ball holding surface 2213 is one of three planes provided on a surface of the disk portion 221B facing the fixed member 203 and is in contact with a rolling ball 222. The spring hook portion 2214 has an end of a spring 223 fixed thereon and is one of two spring hook portions 2214 provided to an outer periphery of the disk portion 221B. The third magnet holder 2215 and the fourth magnet holder 2216 are provided to the disk portion 221B and respectively hold a third magnet 2241 and a fourth magnet 2251.

The first drive unit 212 is a voice coil motor. As illustrated in FIGS. 3 to 7, two voice coil motors (first drive units 212) are disposed having the correcting lens 101B therebetween. This can reduce a size of the lens barrel 100. The first magnet 2121 is a rectangular parallelepiped magnet and is disposed facing the first coil 2122 in a direction of the pitch axis (pitch axis direction). The first magnet 2121 is divided in half by a surface facing the first coil 2122 and has these divided portions magnetized as an N pole and an S pole that are aligned in a direction of a normal of a surface of the first coil 2122 facing the first magnet 2121.

The first coil 2122 is an elliptically formed winding coil and has straight portions extending in a direction of the yaw axis (yaw axis direction). The surface of the first coil 2122 faces a magnetized surface of the first magnet 2121. When current flows through the first coil 2122 energized by the shift drive circuit 130, a Lorentz force is generated in the optical axis direction, which is a direction orthogonal to a direction of the magnetization of the first magnet 2121 and a direction of the current. The two first drive units 212 having the correcting lens 101B therebetween are disposed such that driving forces are generated in directions opposite to each other. A couple of these forces generates a moment around the yaw axis.

The second drive unit 213 has the same configuration as that of the first drive unit 212 except for generating a moment in a direction around the pitch axis, and thus a detailed description thereof will be omitted. In the present embodiment, the drive units may be of any type and configured to generate predetermined driving forces around the pitch axis and the yaw axis. In addition to the voice coil motor used in the present embodiment, a stepping motor, an ultrasonic motor, a motor utilizing electrostatic force, and various kinds of drive units such as a bimorph type are also applicable to the present embodiment.

Next, an operation of the tilt mechanism 210 will be described. The yaw rotating shaft 2021 supported in the yaw axis hole 2111 supports the lens frame 202 to be capable of swinging around the yaw axis relative to the gimbal ring 211. The pitch rotating shaft 2112 supported in the pitch axis hole 2211 supports the gimbal ring 211 to be capable of swinging around the pitch axis relative to the shift member 221. With this configuration, the lens frame 202 is movably supported along a spherical surface centering on the rotational center point O relative to the shift member 221. In this manner, what is called a gimbal mechanism is constituted by the lens frame 202, the gimbal ring 211, and the shift member 221, and serves as the tilt mechanism 210.

In the present embodiment, driving the first drive unit 212 can swing the gimbal ring 211 relative to the shift member 221 in a rotational direction around the yaw axis. Driving the second drive unit 213 can swing the lens frame 202 relative to the gimbal ring 211 in a rotational direction around the pitch axis. Setting the current through the first coil 2122 and the second coil 2132 to predetermined amounts can position the lens frame 202 at a predetermined position on the spherical surface centering on the rotational center point O. This enables tilt amounts of the correcting lens optical axis relative to the optical axis OA in the pitch axis direction and the yaw axis direction to be optionally set.

Next, the shift mechanism 220 will be described. The shift mechanism 220 can move the tilt mechanism 210 in parallel to the fixed member 203 in the plane orthogonal to the optical axis OA (optical-axis orthogonal plane). The shift mechanism 220 in the present embodiment includes the shift member 221, the rolling ball 222, the spring 223, a third drive unit 224, and a fourth drive unit 225. The fixed member 203 may be included in the shift mechanism 220.

The third drive unit 224 includes the third magnet 2241 and a third coil 2242. The fourth drive unit 225 includes the fourth magnet 2251 and a fourth coil 2252. The fixed member 203 has a cylindrical (substantially cylindrical) shape and is held by the fixed barrel 151 holding other lens units. The fixed member 203 has its central opening used as an optical path of the correcting lens 101B. The fixed member 203 includes a ball holder 2031, a spring hook 2032, a third coil holder 2033, and a fourth coil holder 2035. The ball holder 2031 holds the rolling ball 222 in contact and is one of three ball holders 2031 disposed at three different positions in a circumferential direction. The spring hook 2032 is one of two spring hooks 2032 disposed at two different positions, and has one end of the spring 223 fixed thereon. The third coil holder 2033 holds the third coil 2242. The fourth coil holder 2035 holds the fourth coil 2252. The rolling ball 222 in the present embodiment has a spherical shape and is one of three rolling balls 222 used in the present embodiment. In order to achieve a small rolling resistance and highly accurate fabrication, the rolling ball 222 is preferably formed of a hard material such as stainless steel or ceramic.

The spring 223 is a tension spring and is one of two springs 223 used in the present embodiment. The spring 223 has its one end fixed on the spring hook portion 2214 of the shift member 221 and the other end fixed on the spring hook 2032 of the fixed member 203. The spring 223 generates force between the shift member 221 and the fixed member 203 in a direction of pulling them closer. The present embodiment utilizes an elastic force of the tension spring as the spring 223, but is not limited thereto and may utilize a magnetic force or an electrostatic force.

The third drive unit 224 is a voice coil motor. The third magnet 2241 is a rectangular parallelepiped magnet and is disposed facing the third coil 2242 in the optical axis direction. The third magnet 2241 is divided in half by a surface facing the third coil 2242 and has these divided portions magnetized as an N pole and an S pole that are aligned in a direction of a normal of a surface of the third coil 2242 facing the third magnet 2241. The third coil 2242 is an elliptically formed winding coil and includes a straight portion extending in the yaw axis direction. The surface of the third coil 2242 faces a magnetized surface of the third magnet 2241. When current flows through the third coil 2242 energized by the tilt drive circuit 140, a Lorentz force is generated in the pitch axis direction, which is orthogonal to a direction of the current and a direction of the magnetization of the third magnet 2241. The fourth drive unit 225 is a voice coil motor. The fourth drive unit 225 has the same configuration as that of the third drive unit 224 except for generating a Lorentz force in the yaw axis direction, and thus a detailed description thereof will be omitted.

Next, an operation of the shift mechanism 220 will be described. The spring 223, whose both ends are fixed by the spring hook portion 2214 of the shift member 221 and the spring hook 2032 of the fixed member 203, generates a pulling force between the shift member 221 and the fixed member 203. In this manner, the three rolling balls 222 are held between the ball holding surface 2213 of the shift member 221 and the ball holder 2031 of the fixed member 203. This reliably positions the rolling ball 222 and the shift member 221 relative to the fixed member 203 in the optical axis direction. This configuration rotatably supports the shift member 221 relative to the fixed member 203 in the plane orthogonal to the optical axis OA (optical-axis orthogonal plane).

The Lorentz force generated by the current through the third coil 2242 moves the shift member 221 in the pitch axis direction. The Lorentz force generated by the current through the fourth coil 2252 moves the shift member 221 in the yaw axis direction. Setting the current through the third coil 2242 and the fourth coil 2252 to predetermined amounts positions the shift member 221 relative to the fixed member 203 in the optical-axis orthogonal plane.

In the present embodiment, individually controlling the shift mechanism 220 and the tilt mechanism 210 enables a parallel displacement amount and a tilt amount of the correcting lens 101B relative to the optical axis OA of the image pickup optical system 101 to be independently determined. FIG. 9 is a cross-sectional view of the image stabilizing apparatus 200 illustrated in FIG. 7 when the shift mechanism 220 and the tilt mechanism 210 are driven. FIG. 9 illustrates that the correcting lens 101B has moved in the yaw direction (in an upward direction in FIG. 9) and is tilted around the pitch axis (in a clockwise direction in FIG. 9).

Next, a function of the target setting unit 120 will be described. The oscillation of the lens barrel 100 or the image pickup apparatus (camera) caused by hand shake moves an image formed by the image pickup optical system 101 in the pitch axis direction and the yaw axis direction. A description below will be made of image stabilization in the yaw axis direction. Image stabilization in the pitch axis direction is the same as the image stabilization in the yaw axis direction when rotated by 90 degrees, and thus a description thereof will be omitted.

The target setting unit 120 includes the correction angle calculator 121, the shift target setting unit 122, and the tilt target setting unit 123. The correction angle calculator 121 calculates a time integral of the angular velocity of the lens barrel 100 (or the image pickup apparatus) detected by the shake detection portion 110 so as to calculate a correction angle θ (correction angle of the lens barrel 100) to be corrected by the image stabilizing apparatus 200. At the same time, the correction angle calculator 121 performs, as necessary, adjustment of an integral interval, removal of a high frequency component and a low frequency component, and phase compensation of an angular velocity signal, for example. This enables distinction between a camera angle change intended by the user such as those caused by a pan operation and a tilt operation and a camera angle change not intended by the user such as that caused by hand shake, so as to achieve image stabilization with reduced awkwardness.

The shift target setting unit 122 stores a function f1 used for determining a displacement amount (the shift target s) of the shift mechanism 220 in the yaw axis direction in accordance with the correction angle θ of the lens barrel 100 (camera) to be corrected, which is calculated by the correction angle calculator 121. The function f1 can have different forms depending on a position (lens position zp) of the lens 101C in the optical axis direction. This allows the shift target s to be expressed as s=f1 (θ, zp). The function f1 is a monotonically increasing function of the correction angle θ and is proportional in the present embodiment. The function f1 in the present embodiment has different proportional constants for different lens positions zp of the lens 101C in the optical axis direction. As described above, the lens position zp of the lens 101C in the optical axis direction can be detected by the lens position detection unit 160.

The tilt target setting unit 123 stores a function f2 used for determining a displacement amount (the tilt target t) of the tilt mechanism 210 around the pitch axis in accordance with the displacement amount (shift target s) of the shift mechanism 220 set by the shift target setting unit 122. Use of the shift mechanism 220 to move the correcting lens 101B in the optical-axis orthogonal direction in the image stabilization may degrade optical performance of the image pickup optical system 101. The degradation of the optical performance may involve occurrence of different focusing states on both left and right sides of the imaging plane, which is called a one-side out-of-focus effect. Such degradation of the optical performance can be improved by tilting the optical axis of the correcting lens 101B in accordance with a shift displacement amount (the shift target s). The tilt mechanism 210 having such a function is included in the image pickup optical system 101 in the present embodiment.

The function f2 stored in the tilt target setting unit 123 is used for achieving tilt correction and is determined in accordance with the shift displacement amount (shift target s). The function f2 can have different forms depending on the lens position zp of the lens 101C in the optical axis direction. This allows the tilt target t to be expressed as t=f2 (s, zp). Since the function f1 is the monotonically increasing function of the correction angle θ, the tilt target t is uniquely determined by the correction angle θ and the lens position zp. This allows the tilt target t to be also expressed as t=f3 (θ, zp).

As illustrated in FIG. 9, the shift mechanism 220 is used to move the correcting lens 101B in the yaw axis direction, and the tilt mechanism 210 is used to move the correcting lens 101B around the yaw axis. This achieves movement of the correcting lens optical axis on a section including the optical axis OA and the yaw axis (Y axis), the movement including both parallel movement in the yaw axis direction and tilting movement relative to the optical axis.

Figure 10:
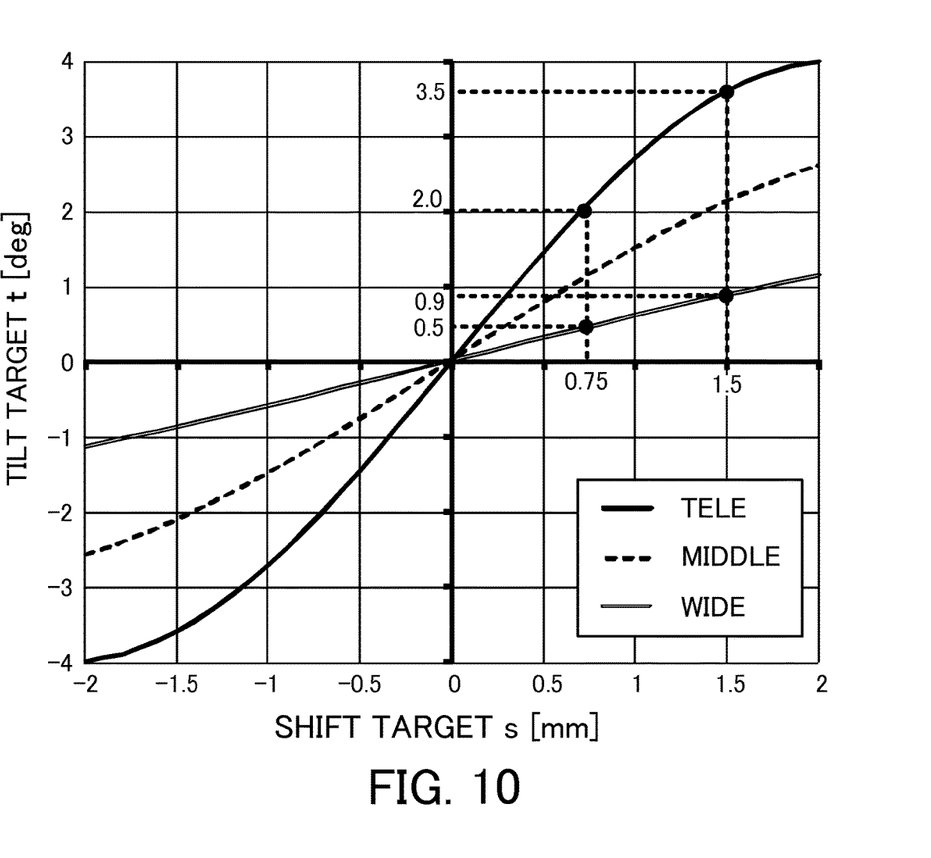
FIG. 10 is an explanatory diagram of a function used for determining a tilt displacement amount in accordance with a shift displacement amount in the embodiment.

FIG. 10 is an explanatory diagram of the function f2 in the present embodiment, which is used for determining a tilt displacement amount (the tilt target t) in accordance with the shift displacement amount (shift target s). In FIG. 10, a vertical axis represents the tilt target t [deg], and a horizontal axis represents the shift target s [mm]. In FIG. 10, plots labeled with "TELE", "MIDDLE", and "WIDE" respectively correspond to different lens positions zp of the lens 101C in the optical axis direction. As illustrated in FIG. 10, the function f2 in the present embodiment has origin symmetry and is a continuous and monotonic function. As illustrated in FIG. 10, in each of the plots of the lens positions zp, the tilt target t is set such that the tilt target t increases as the shift target s.

In the present embodiment, since the function f2 is a function passing through an origin, the tilt displacement amount (tilt target t) is zero when the shift displacement amount (shift target s) is zero. This allows, when no shake of the lens barrel 100 (camera) is present, the optical axis of the correcting lens 101B to coincide with an optical axis of other lenses in the image pickup optical system 101 so as to improve the optical performance. The origin symmetry of the function f2 allows a relation between the shift target s and the tilt target t to be determined independently from a moving direction of the correcting lens 101B. The origin in the present embodiment is defined to be a position of the correcting lens 101B when a correction angle signal (the correction angle θ) is zero. Typically, in such a situation, the displacement amount of the correcting lens 101B in the direction orthogonal to the optical axis OA and the tilt amount thereof are zero relative to the optical axis OA, indicating that the optical axis of the correcting lens 101B coincides with an optical axis of the image pickup optical system 101. This allows the optical performance when no hand shake (image blur) is present to be improved. However, the present embodiment is not limited thereto. For example, for purpose of correcting assembly error of the image pickup optical system 101, the origin may be such a state (position) that the optical axis of the correcting lens 101B is not coincided with the optical axis of the image pickup optical system 101.

In the present embodiment, the function f2 being a continuous function allows values of the tilt target t corresponding to the shift target s to be smoothly determined, thereby reliably moving the tilt mechanism 210. In the present embodiment, the function f2 being a monotonic function causes an absolute value of the tilt target t to be larger for a larger absolute value of the shift target s. The function f2 can be monotonically increasing or monotonically decreasing depending on a configuration of the image pickup optical system 101 and sign conventions of the shift target s and the tilt target t.

Next, referring to FIG. 10, an example of determining the tilt displacement amount (tilt target t) in accordance with the shift displacement amount (shift target s) will be described. When the lens position zp is at a position representing a "TELE" state and the function f1 calculates the shift target s [mm] to be 0.75 mm, the function f2 illustrated in FIG. 10 shows that the tilt target t [deg] is 2.0 degrees. When the shift target s [mm] is 1.5 mm, the tilt target t [deg] is 3.5 degrees. In contrast, when the lens position zp is at a position representing a "WIDE" state and the function f1 calculates the shift target s[mm] to be 0.75 mm, the function f2 illustrated in FIG. 10 shows that the tilt target t [deg] is 0.5 degrees. When the shift target s [mm] is 1.5 mm, the tilt target t [deg] is 0.9 degrees.

In each state, the shift mechanism 220 and the tilt mechanism 210 move the correcting lens 101B by the displacement amounts (the shift target s and the tilt target t) so as to perform the image stabilization. As described above, the relation between the tilt target t and the shift target s changes in accordance with the lens position zp of the lens 101C in the optical axis direction.

Figure 11:
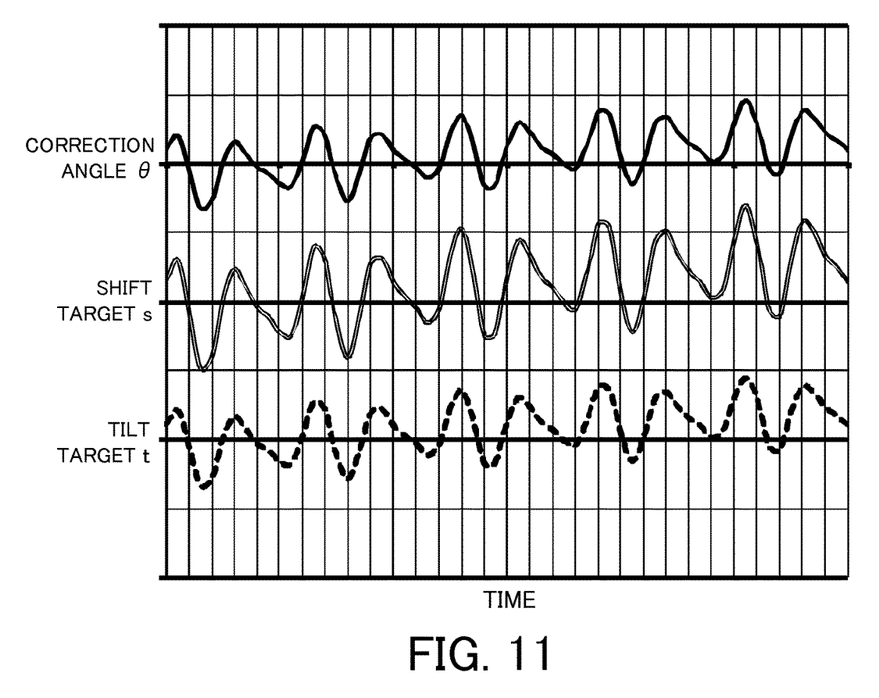
FIG. 11 is an explanatory diagram of an image blur correction in the embodiment.

FIG. 11 is an explanatory diagram of an image blur correction in the present embodiment and illustrates the shift target s and the tilt target t corresponding to a predetermined correction angle signal (correction angle θ). In FIG. 11, a vertical axis represents the correction angle θ, the shift target s, and the tilt target t, and a horizontal axis represents time. As illustrated in FIG. 11, in the present embodiment, the image stabilization can be performed with the shift target s and the tilt target t in synchronization with the correction angle θ.

The present embodiment provides advantages described below. Firstly, the optical performance when the correcting lens 101B is moved can be improved. In the present embodiment, the displacement amount (tilt target t) of the tilt mechanism 210 is determined in accordance with the displacement amount (shift target s) of the shift mechanism 220. In other words, the image stabilizing apparatus 200 performs the movement while synchronizing the shift mechanism 220 and the tilt mechanism 210. This allows, when the correcting lens 101B is moved in the optical-axis orthogonal direction in the image stabilization, the optical performance to be improved by moving the tilt mechanism 210 by a predetermined amount.

Secondarily, the optical performance when the correcting lens 101B is moved can be improved in accordance with the position of the image pickup optical system 101 in the optical axis direction. In the present embodiment, the function f2 used for determining the tilt displacement amount (tilt target t) corresponding to the shift displacement amount (shift target s) is changed in accordance with an output of the lens position detection unit 160. This allows, if a positional relation of the image pickup optical system 101 in the optical axis direction is changed, the optical performance when the shift mechanism 220 is driven to be improved.

Thirdly, the displacement amount of the correcting lens 101B in the optical-axis orthogonal direction and the tilt amount thereof can be easily controlled independently from each other. In the present embodiment, the gimbal mechanism is used to tilt the optical axis of the correcting lens 101B. This allows a position of the rotational center point O relative to the correcting lens 101B to be unchanged when the optical axis of the correcting lens 101B is tilted. Thus, the displacement amount of the correcting lens 101B in the optical-axis orthogonal direction and the tilt amount thereof can be easily controlled independently from each other.

Fourthly, a highly responsive and highly accurate position control can be achieved. In the present embodiment, the drive units of the shift mechanism 220 and the drive units of the tilt mechanism 210 each include a voice coil motor. Using actuators of the same type in both of the shift mechanism 220 and the tilt mechanism 210 facilitates driving of the shift mechanism 220 and the tilt mechanism 210 in synchronization. Use of the voice coil motor allows a highly responsive and highly accurate position control to be achieved.

Next, a modified example of the present embodiment will be described. The image stabilizing apparatus 200 in the present embodiment has a configuration where the shift mechanism 220 supports the tilt mechanism 210, but is not limited thereto. The relation between the shift mechanism 220 and the tilt mechanism 210 may be inversed. A configuration where the tilt mechanism 210 supports the shift mechanism 220 still allows the parallel displacement amount and the tilt amount of the correcting lens 101B relative to the optical axis of the image pickup optical system 101 to be independently determined and the same advantages as those with the opposite relation to be achieved.

As described above, in the image stabilizing apparatus 200 (the lens barrel 100) in the present embodiment, the target setting unit 120 (control unit) sets the tilt target value (the tilt target t) of the tilt mechanism 210 (tilting unit) in accordance with the displacement target value (shift target s) of the shift mechanism 220 (moving unit). The control unit preferably sets the tilt target value such that the tilt target value increases as the displacement target value.

The control unit preferably stores a function (the function f2) associating the displacement target value with the tilt target value. The function f2 is preferably a function in which a relation between the displacement target value and the tilt target value is symmetry with respect to an origin which is the position of the correcting lens 101B (optical system) when the shake detection portion 110 (detection unit) does not detect shake. The function f2 is more preferably a continuous function in which the relation between the displacement target value and the tilt target value continuously changes. Moreover, the function f2 is preferably a function in which the tilt target value monotonically increases or decreases with respect to the displacement target value.

The target setting unit 120 (control unit) preferably includes the correction angle calculator 121 (a calculating unit), the shift target setting unit 122 (a first setting unit), and the tilt target setting unit 123 (a second setting unit). The calculating unit calculates the correction angle θ based on shake information. The first setting unit sets the displacement target value (shift target s) based on the correction angle θ. The second setting unit sets the tilt target value (tilt target t) based on the displacement target value. The control unit more preferably sets the tilt target value based on position information (a position in the optical axis direction) of the lens 101C (lens as a second optical system).

The lens barrel 100 preferably includes the lens moving mechanism 150 (second moving unit) that supports the lens 101C (second optical system) movably in the optical axis direction, and the lens position detection unit 160 (position detection unit) that detects a position of the second optical system in the optical axis direction. The control unit changes the function f2 based on the position information of the second optical system obtained from the position detection unit.

The present embodiment provides an image stabilizing apparatus, a lens barrel, and an image pickup apparatus that have improved optical performances.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248893, filed on Dec. 2, 2013, which is hereby incorporated by reference herein in its entirety.

What is claimed is:

1. An image stabilizing apparatus comprising:
a movable member holding a lens;
a moving unit configured to move the movable member in a predetermined plane;
a tilting unit configured to tilt the movable member relative to the predetermined plane;
a detection unit configured to detect shake; and
a control unit configured to control the moving unit and the tilting unit,
wherein the control unit sets a shift target value of the moving unit based on shake information obtained by the detection unit, and
wherein the control unit sets a tilt target value of the tilting unit in accordance with the shift target value.

2. The image stabilizing apparatus according to claim 1, wherein the control unit sets the tilt target value such that the tilt target value increases as the shift target value increases.

3. The image stabilizing apparatus according to claim 1, wherein the control unit stores a function associating the shift target value with the tilt target value.

4. The image stabilizing apparatus according to claim 3, wherein the function is a function where a relation between the shift target value and the tilt target value is symmetrical with respect to an origin which is a position of the lens when the detection unit does not detect the shake.

5. The image stabilizing apparatus according to claim 3, wherein the function is a continuous function in which a relationship between the shift target value and the tilt target value continuously changes.

6. The image stabilizing apparatus according to claim 3, wherein the function is a function in which the tilt target value monotonically increases or decreases with respect to the shift target value.

7. The image stabilizing apparatus according to claim 1, wherein the control unit includes:
   a calculating unit configured to calculate a correction angle based on the shake information,
   a first setting unit configured to set the shift target value based on the correction angle, and
   a second setting unit configured to set the tilt target value based on the shift target value.

8. The image stabilizing apparatus according to claim 1, wherein the control unit sets the tilt target value based on position information of a second lens.

9. The image stabilizing apparatus according to claim 1, wherein:
   the predetermined plane is a plane orthogonal to an optical axis,
   the moving unit moves the movable member in a first direction and a second direction in the plane orthogonal to the optical axis, and
   the tilting unit rotates the movable member around a first axis along the first direction and a second axis along the second direction.

10. A lens barrel comprising the image stabilizing apparatus according to claim 1.

11. The lens barrel according to claim 10, further comprising:
   a second moving unit configured to movably support a second lens in an optical axis direction; and
   a position detection unit configured to detect a position of the second lens in the optical axis direction,
   wherein the control unit changes a function associating the shift target value with the tilt target value based on position information of the second lens obtained from the position detection unit.

12. An image pickup apparatus comprising the lens barrel according to claim 10.

* * * * *